US012806805B2

(12) United States Patent
Song et al.

(10) Patent No.: US 12,806,805 B2
(45) Date of Patent: Nov. 24, 2026

(54) SPIRAL LOOP TYPE GRIPPER AND A MEANS OF TRANSPORTATION WITH THE GRIPPER

(71) Applicant: Korea Advanced Institute of Science and Technology, Daejeon (KR)

(72) Inventors: Kahye Song, Seoul (KR); Gyeongji Kang, Seoul (KR); Deayoung Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 974 days.

(21) Appl. No.: 18/159,896

(22) Filed: Jan. 26, 2023

(65) Prior Publication Data

US 2023/0264371 A1 Aug. 24, 2023

(30) Foreign Application Priority Data

Jan. 27, 2022 (KR) ........................ 10-2022-0012547

(51) Int. Cl.
*B25J 15/10* (2006.01)
*B25J 15/02* (2006.01)
*B25J 15/12* (2006.01)

(52) U.S. Cl.
CPC ............... *B25J 15/10* (2013.01); *B25J 15/02* (2013.01); *B25J 15/12* (2013.01)

(58) Field of Classification Search
CPC . B25J 9/104; B25J 9/1045; B25J 9/105; B25J 9/106; B25J 9/1065; B25J 9/107; B25J 9/1085; B25J 15/0033; B25J 15/02; B25J 15/0206; B25J 15/022; B25J 15/0233; B25J 15/0253; B25J 15/0266; B25J 15/0286; B25J 15/10; B25J 15/103;
(Continued)

(56) References Cited

U.S. PATENT DOCUMENTS 3,838,679 A * 10/1974 Welch ..................... F24B 1/193
211/49.1
5,224,746 A * 7/1993 Mullins ..................... B66C 1/16
294/119.2

(Continued)

FOREIGN PATENT DOCUMENTS

WO 2016/140712 A1 9/2016
WO 2016172670 A1 10/2016

OTHER PUBLICATIONS

Li, Shuguang et al., "A Vacuum-driven Origami "Magic Ball" Soft Gripper", MIT Open Access Articles, 2019 IEEE International Conference on Robotics and Automation (May 2019).

(Continued)

*Primary Examiner* — Joshua E Rodden
(74) *Attorney, Agent, or Firm* — BLANK ROME LLP

(57) ABSTRACT

Provided is a loop-type gripper gripping an object which may smoothly grip and stably lift a heavy object, an apparatus for conveyance with the gripper, and a gripping method. The loop-type gripper whose one end is connected to a first fixture and the other end is connected to a second fixture according to the present disclosure, includes a plurality of twisted loops each having a predetermined curvature, wherein middle portions of the plurality of loops gather together or spread out to grip or release the object based on relative rotation of the first fixture and the second fixture.

16 Claims, 13 Drawing Sheets

(58) Field of Classification Search
CPC ....... B25J 15/106; B25J 15/12; F03G 7/0614; F03G 7/06145
USPC .................... 294/86.42, 119.2, 265; 211/120
See application file for complete search history.

(56) References Cited

U.S. PATENT DOCUMENTS

| | | | | |
|---|---|---|---|---|
| 6,666,339 | B2 * | 12/2003 | Platek | A47F 7/00 47/41.13 |
| 8,469,970 | B2 * | 6/2013 | Diamant | A61B 17/221 606/127 |
| 9,464,642 | B2 | 10/2016 | Ilievski et al. | |
| 10,524,810 | B2 * | 1/2020 | Walish | A61M 25/0074 |
| 2007/0239141 | A1 | 10/2007 | Hartley et al. | |
| 2016/0256179 | A1 * | 9/2016 | Walish | A61B 90/03 |
| 2018/0235187 | A1 | 8/2018 | Suh | |
| 2020/0085457 | A1 * | 3/2020 | Walish | A61B 90/03 |
| 2025/0153367 | A1 * | 5/2025 | Song | B25J 15/0033 |

OTHER PUBLICATIONS

Dian Yang, et al., "Buckling of Elastomeric Beams Enables Actuation of Soft Machines", Adv. Mater. 2015, 27, 6323-6327.

Extended European Search Report issued in EP Application No. 23747374.9 dated Nov. 10, 2025.

* cited by examiner

[FIG. 1]
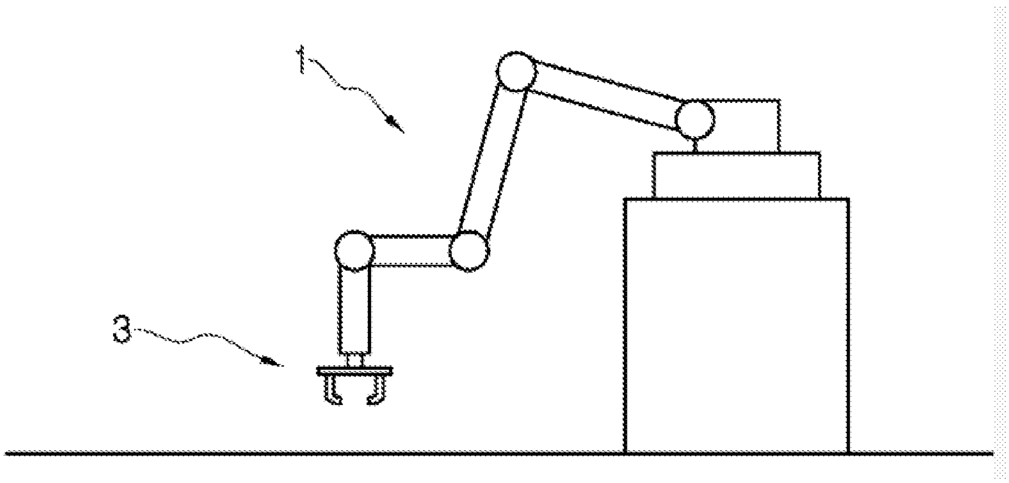
Prior Art

[FIG. 2]
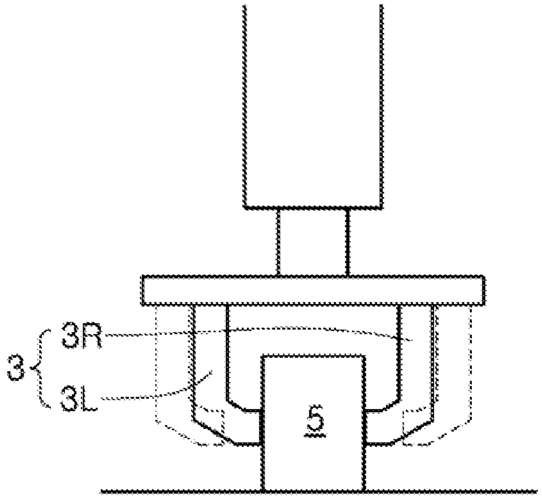
Prior Art

[FIG. 3]
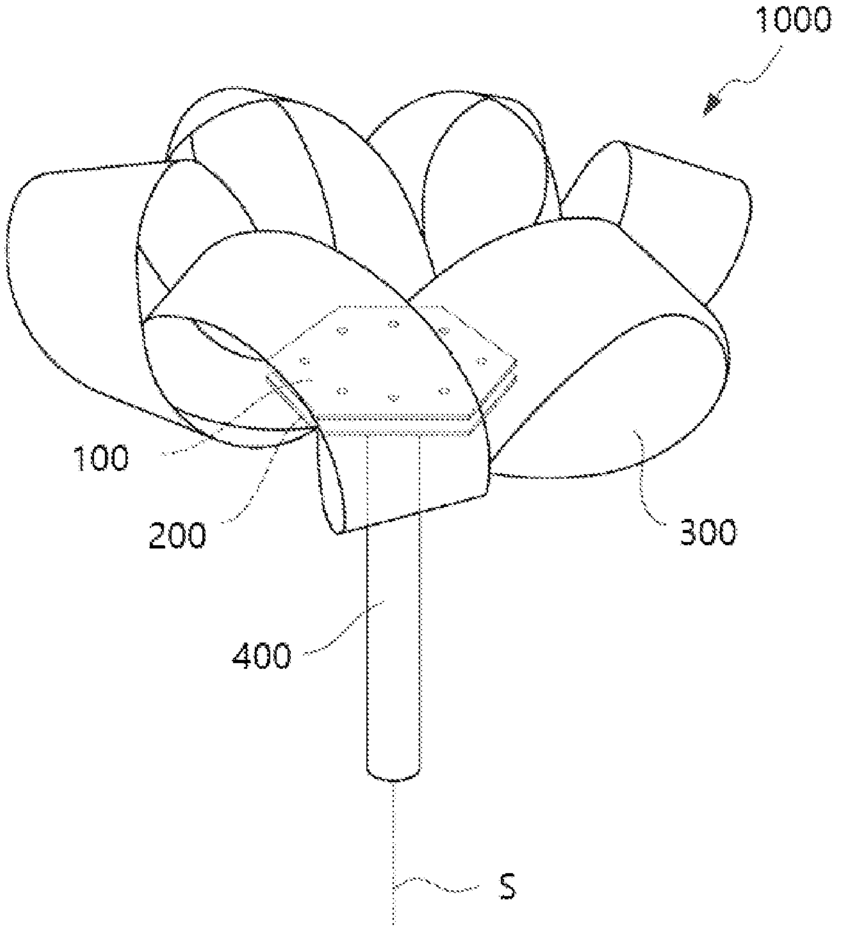

[FIG. 4]
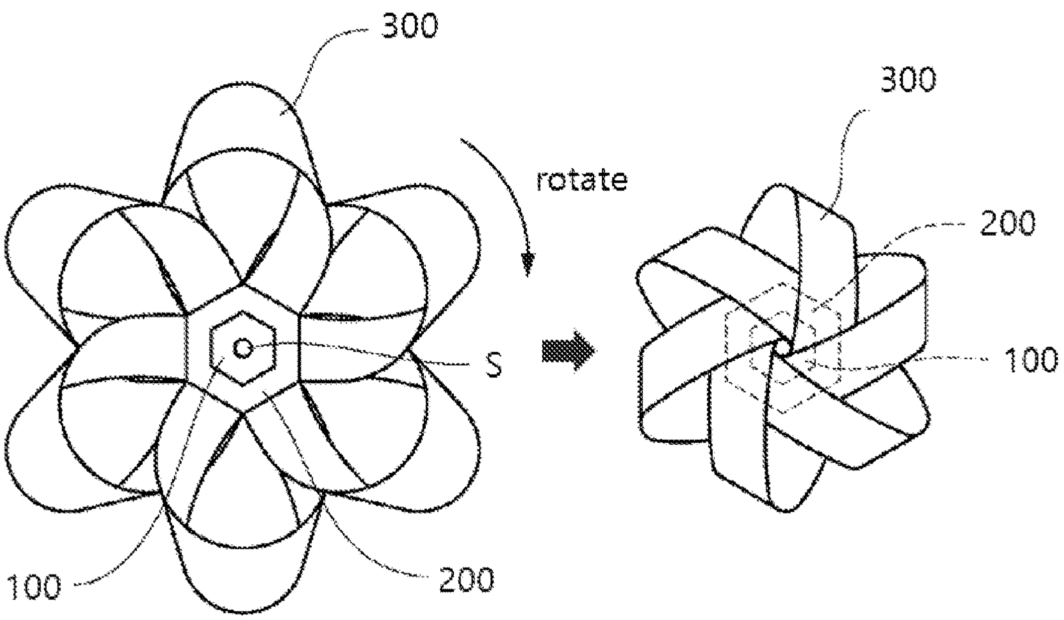

[FIG. 5]
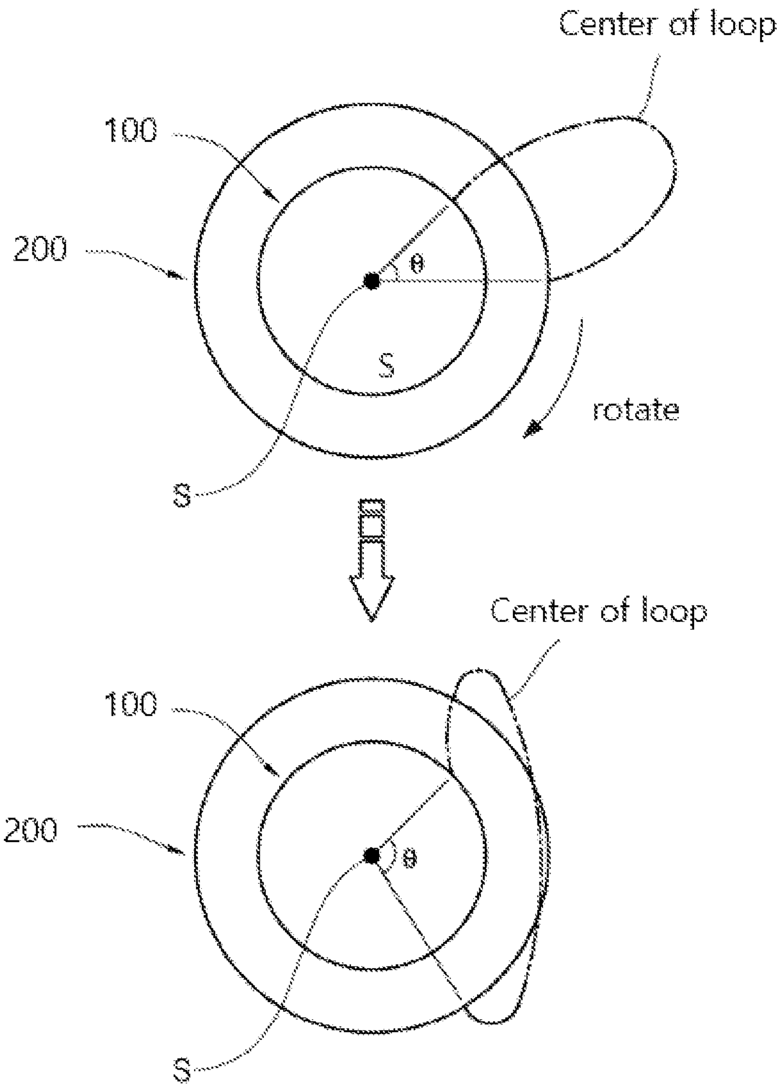

[FIG. 6]
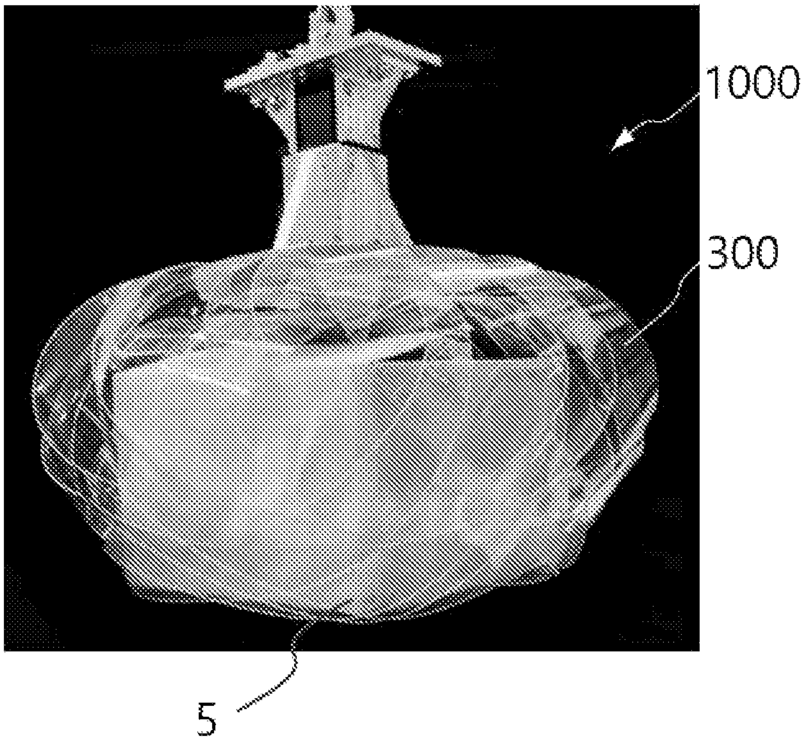

[FIG. 7]
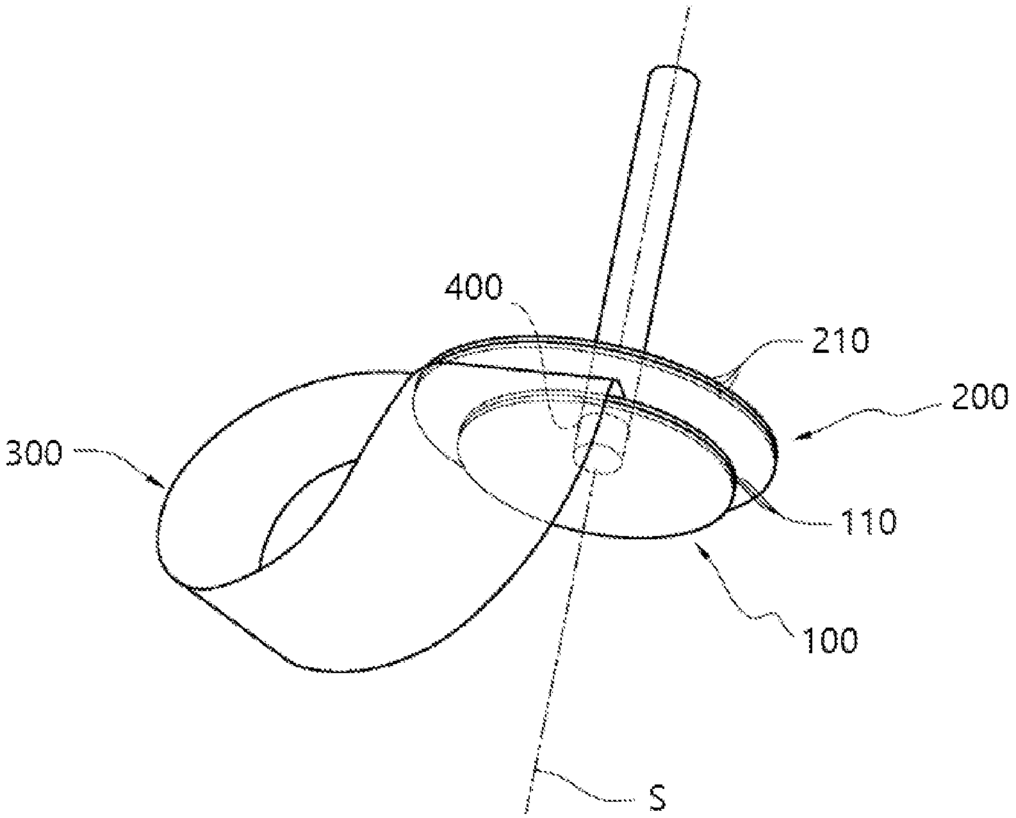

[FIG. 8]
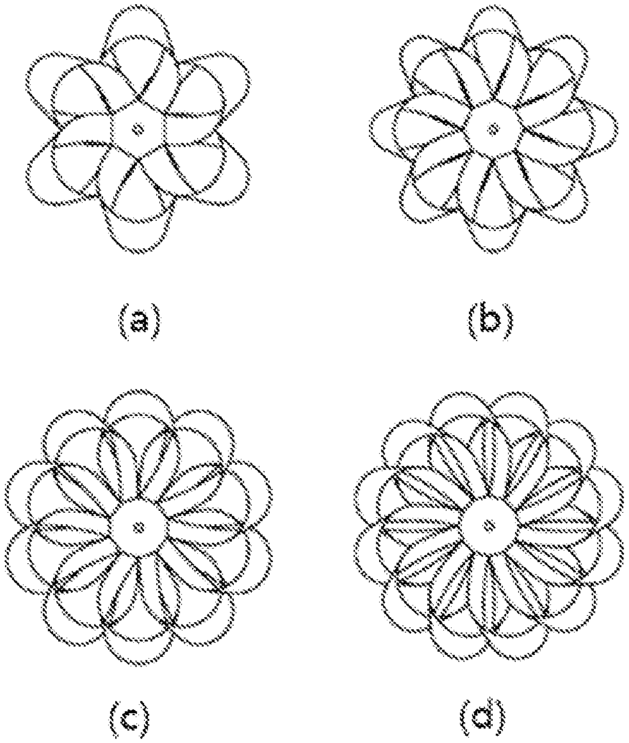

[FIG. 9]
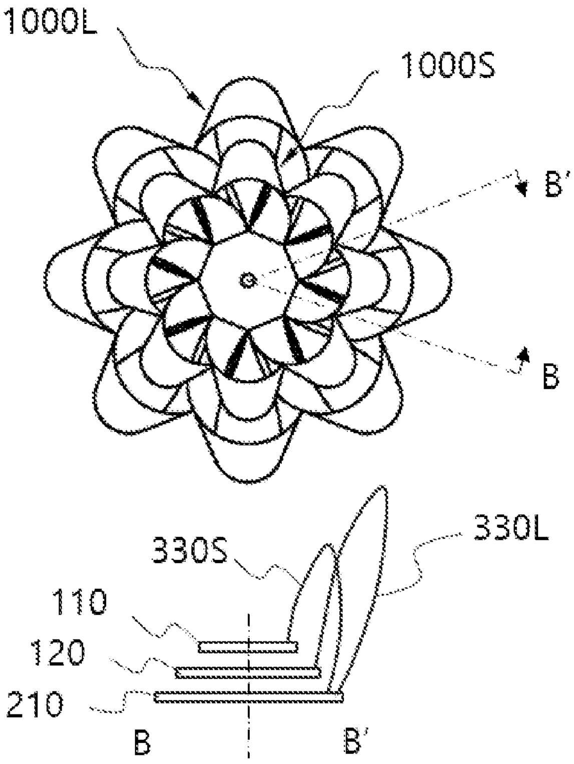

[FIG. 10]
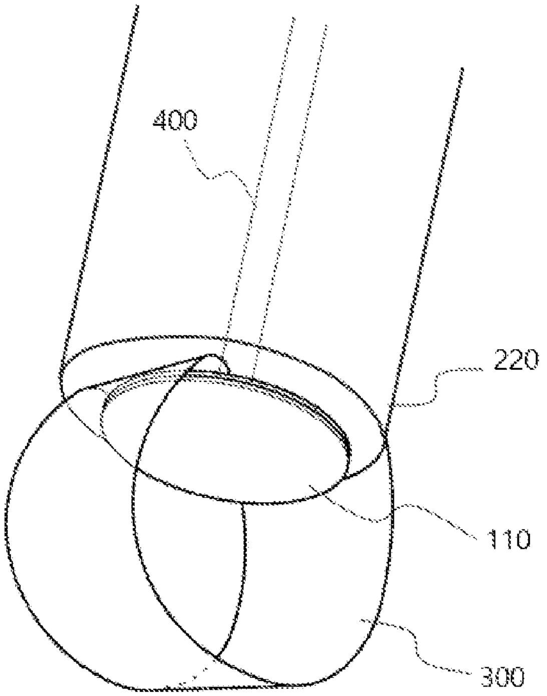
[FIG. 11]
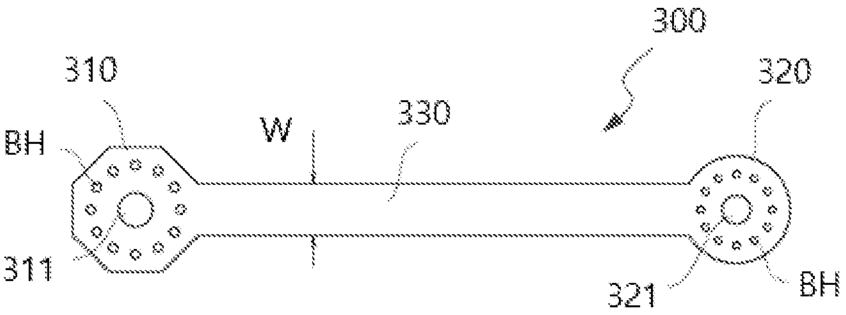

[FIG. 12]
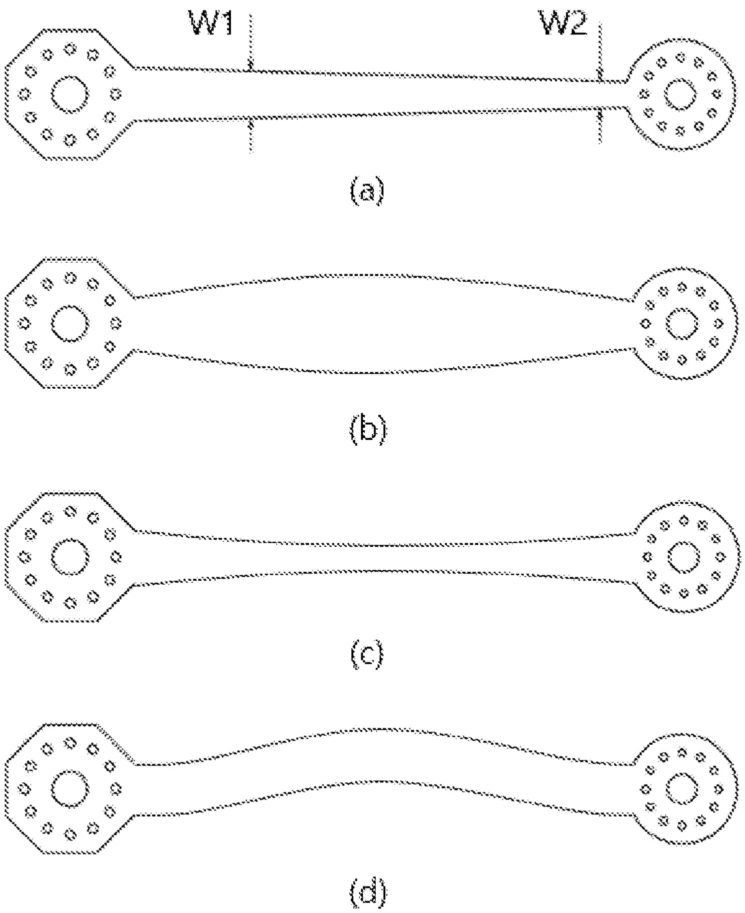

[FIG. 13]
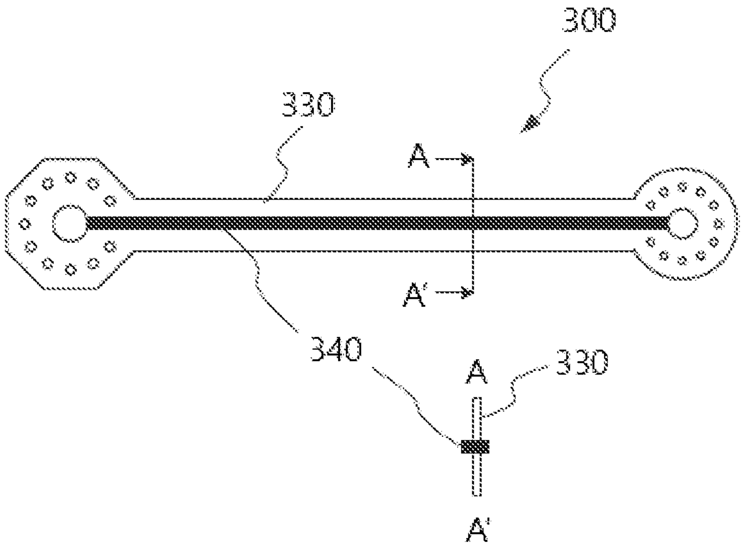
[FIG. 14]
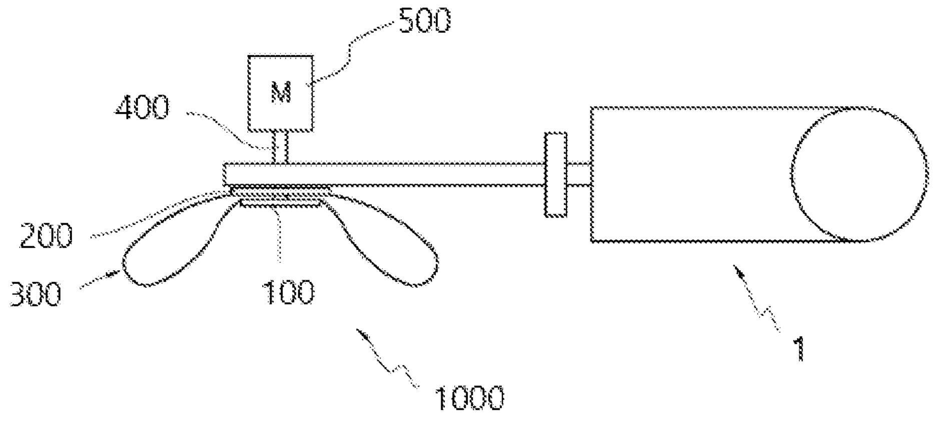

[FIG. 15]
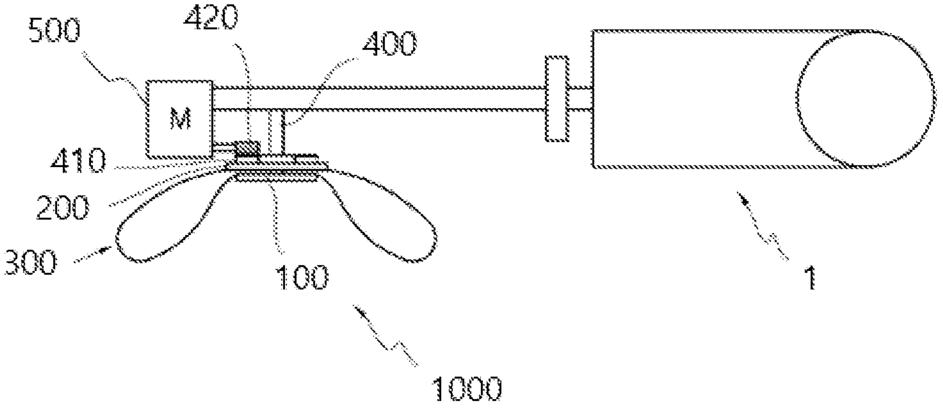

SPIRAL LOOP TYPE GRIPPER AND A MEANS OF TRANSPORTATION WITH THE GRIPPER

CROSS-REFERENCE TO RELATED APPLICATIONS

This application claims priority under 35 U.S.C. § 119 to Korean Patent Application No. 10-2022-0012547, entitled "Spiral loop type gripper and an apparatus for conveyance with gripper" and filed on Jan. 27, 2022, in the Korean Intellectual Property Office, the disclosure of which is incorporated herein by reference in its entirety.

TECHNICAL FIELD

The following disclosure relates to a gripper for gripping an object, an apparatus for conveyance with the gripper, and a gripping method, and more particularly, to a gripper gripping an object which may smoothly and stably lift a heavy object to prevent damage to the object, an apparatus for conveyance with the gripper, and a gripping method.

BACKGROUND

In general, a gripper engaging an object and an apparatus for conveyance which may lift the object from its current location and convey or transport the object to a destination may be required in order to move a location of the object. A representative example of the apparatus for conveyance may be a robot arm, a conveyor, or a hydraulic system which may extend a stroke, and the apparatus for conveyance may grip the object with the gripper, lift the object, move the object to a desired location, and then put the object down at the destination.

Referring to FIGS. 1 and 2, FIG. 1 is a conceptual diagram showing a gripper mounted on a distal end of a robot arm according to the prior art, and FIG. 2 is a conceptual diagram showing a relationship in which an object is pressed and then lifted by the gripper shown in FIG. 1. As shown in FIG. 1, a robot arm 1 may be designed to have a multi-joint structure to move an object 5 within a usable range of the robot arm 1. A gripper 3 may be mounted on a distal end of the robot arm 1, and the gripper 3 may press a side of the object 5 to grip the object 5.

In this case, a force (hereinafter referred to as 'grip force') exerted by the gripper 3 on the side of the object 5 is required to be greater than a load of the object 5. The reason is that it is required to prevent the object 5 from slipping off the gripper 3 when moved by an operation of the robot arm 1.

Therefore, it is necessary to select an appropriate gripper based on the weight or shape of the object and mount the selected gripper on the robot arm. However, when the objects respectively have irregular shapes or different weights, it may be difficult to select the appropriate gripper each time and then replace and mount the selected gripper on the robot arm.

In addition, an actuator may also be required to have proportionally increased capacity to generate a large grip force, and in this case, the actuator may also be generally required to have increased weight and volume. In the case where the actuator has the increased weight and volume, a payload may be increased when the gripper is mounted on the robot arm or the conveyor, which is the apparatus for conveyance, and the apparatus for conveyance may thus also be required to have the proportionally increased capacity.

In addition, FIG. 2 shows a process in which the gripper 3 grips the side of the object 5 having a vertical structure. However, a point where a left gripper 3L or a right gripper 3R comes into contact with the object 5 may be unstable when the object 5 has a concave or convex shape, the center of gravity of the object 5 may be changed in a process of lifting the object 5, and the object 5 may thus slip off.

It may be inefficient in that various types of grippers need to be provided to move such objects having various types or shapes, and the gripper thus needs to be replaced frequently depending on the object.

Although not shown in the drawings, a gripper may convey the object by adsorbing the object by using a suction plate. In this case, the suction plate may need to be managed periodically to secure a suction power for the object, and components for maintaining the inside of the suction plate in a vacuum state, such as a vacuum pump or a compressor, may need to be provided outside the robot arm as separate essential components. In addition, the gripper with the suction plate may be applied only to a light object. In order to be applied to a heavy object, a large gripper with a large number of suction plates may need to be provided, thus increasing the capacity of the apparatus for conveyance.

SUMMARY

Embodiments of the present disclosure are directed to providing a gripper gripping an object which may smoothly grip and stably lift a heavy object to prevent damage to the object in such a manner that the object is gripped using a plurality of spiral loops and lifted by a vertical drag force, an apparatus for conveyance with the gripper, and a gripping method.

In one general aspect, a gripper whose one end is connected to a first fixture and the other end is connected to a second fixture, includes a plurality of twisted loops each having a predetermined curvature, wherein the plurality of loops gather or spread to grip or release the object based on relative rotation of the first fixture and the second fixture.

The first fixture may be a plate-shaped first plate, the second fixture may be a plate-shaped second plate, one end of each of the plurality of loops may be coupled to the first plate or extended from the first plate, and the other end of each of the plurality of loops may be coupled to the second plate or extended from the second plate.

A rotation shaft rotating the first plate or the second plate may be coupled to the first plate or the second plate.

The first plate may be formed by stacking the one end of each of the plurality of loops on top of each other, and the second plate may be formed by stacking the other end of each of the plurality of loops on top of each other.

A large gripper having a longer strap and a small gripper having a shorter strap may be disposed together.

The gripper may further include an intermediate plate disposed between the first plate and the second plate, one end of the large gripper may be connected to the first plate, and the other end of the large gripper may be connected to the intermediate plate, one end of the small gripper may be connected to the first plate, and the other end of the small gripper may be connected to the second plate, and the large gripper and the small gripper may be controlled based on the relative rotation of the first plate, the intermediate plate, and the second plate.

The intermediate plate and the second plate may be rotated together or separately rotated relative to each other.

The first fixture may be a plate-shaped first plate, and the second fixture may be a cylindrical cylinder.

In the gripper, a rotation shaft may be coupled to the first plate to rotate the first plate, or rotate the cylindrical cylinder.

The loop may be a strap having a predetermined elasticity.

The loop may have a predetermined width or a width gradually decreased or increased from one end to the other end, or a middle portion thereof may have a width greater or smaller than that of one end or the other end.

The loop may be an arc-shaped strap bent with the predetermined curvature.

The loop may include a reinforcing member formed therein and having greater rigidity than that of the strap.

In another general aspect, provided is a gripping method for gripping an object by using a loop-type gripper, wherein the gripper has one end connected to a first fixture and the other end connected to a second fixture, and includes a plurality of twisted loops each having a predetermined curvature, the plurality of loops gather together to grip the object when the first fixture and the second fixture are rotated relative to each other in one direction, and the plurality of loops each spread to release the object when the first fixture and the second fixture are rotated relative to each other in the other direction.

The relative rotation may control a spread degree of the plurality of loops based on a size of the object to be gripped, or a gathering degree of the plurality of loops based on a grip force for gripping the object.

In still another general aspect, an apparatus for conveyance includes: a gripper mounted on a distal end of the apparatus for conveyance, having one end connected to a first fixture and the other end connected to a second fixture, and including a plurality of twisted loops each having a predetermined curvature, and gripping or releasing the object by the plurality of loops that gather together or spread out based on relative rotation of the first fixture and the second fixture; and a motor rotating the first fixture or second fixture of the gripper.

The first fixture may be a plate-shaped first plate, the second fixture may be a plate-shaped second plate, one end of each of the plurality of loops may be coupled to the first plate or extended from the first plate, and the other end of each of the plurality of loops may be coupled to the second plate or extended from the second plate.

The apparatus for conveyance may further include a rotation shaft connected to the motor and rotating the first plate or the second plate.

The first plate may be formed by stacking the one end of each of the plurality of loops on top of each other, and the second plate may be formed by stacking the other end of each of the plurality of loops on top of each other.

The first fixture may be a plate-shaped first plate, and the second fixture may be a cylindrical cylinder.

A rotation shaft of the motor may be connected to the first plate to rotate the first plate, or the motor may be connected to the cylindrical cylinder to rotate the cylindrical cylinder.

BRIEF DESCRIPTION OF THE DRAWINGS

FIG. 1 is a conceptual diagram showing a gripper mounted on a distal end of a robot arm according to the prior art.

FIG. 2 is a conceptual diagram showing a relationship in which an object is pressed and then lifted by the gripper shown in FIG. 1.

FIG. 3 is a perspective view showing a gripper according to an embodiment of the present disclosure.

FIGS. 4 and 5 are views for explaining a process in which the gripper is closed to grip an object according to an embodiment of the present disclosure.

FIG. 6 is a photograph showing a state where the gripper grips the object according to an embodiment of the present disclosure.

FIG. 7 is a perspective view showing an example of shapes of a loop and a fixture in the present disclosure.

FIGS. 8A to 8D are conceptual diagrams of modifications of the present disclosure in which the number of loops is modified.

FIG. 9 is a conceptual diagram of a modification including the plurality of grippers having different sizes.

FIG. 10 is a perspective view showing another example of shapes of the loop and the fixture in the present disclosure.

FIG. 11 is a plan view showing another example of the loop in the present disclosure.

FIGS. 12A to 13 are views each showing another example of the loop in the present disclosure.

FIG. 14 is a conceptual diagram showing an example in which the gripper is mounted on a robot arm according to the present disclosure.

FIG. 15 is a conceptual diagram showing another example in which the gripper is mounted on the robot arm according to the present disclosure.

DETAILED DESCRIPTION OF EMBODIMENTS

Specific embodiments and features of the present disclosure are described in detail with reference to the accompanying drawings. However, the present disclosure is not limited to these specific embodiments and drawings, and may be implemented in various different forms. These embodiments are provided only to make the present disclosure complete and allow those skilled in the art to completely appreciate the scope of the present disclosure, and the present disclosure is defined by the scope of the claims. Throughout the specification, the same reference numerals denote the same components.

In describing the embodiments of the present disclosure, omitted is a detailed description of a case where it is decided that the detailed description of the known functions or configurations related to the present disclosure may unnecessarily obscure the gist of the present disclosure. In addition, terms used herein are defined in consideration of their functions in the embodiments of the present disclosure, and may be construed in different ways by intentions of users or operators, practices, or the like. Therefore, the terms should be defined on the basis of the contents throughout the specification.

FIG. 3 is a perspective view showing a gripper according to an embodiment of the present disclosure. Referring to FIG. 3, the gripper according to the present disclosure may have one end connected to a first fixture 100 and the other end connected to a second fixture 200, and may include a plurality of twisted loops 300 each having a predetermined curvature. The plurality of loops 300 may gather together or spread out to grip or release an object based on relative rotation of the first fixture 100 and the second fixture 200. Here, the middle portion of the loop 300 may be bent with the predetermined curvature as the first fixture 100 and the second fixture 200 are disposed to be adjacent to each other; the curvature of the middle portion of the loop 300 may be changed and the loop 300 may thus be twisted or untwisted, when the first fixture 100 and the second fixture 200 are rotated relative to each other; and accordingly, the object may be gripped or released from the grip.

FIGS. 4 and 5 are views for explaining a process in which the gripper is closed to grip the object according to an embodiment of the present disclosure. Referring to FIGS. 4 and 5, the plurality of loops 300 may be twisted and gather together in a case where the relative rotation is performed in the gripper according to the present disclosure, i.e., when the second fixture 200 is rotated while the first fixture 100 is fixed, or the first fixture 100 is rotated while the second fixture 200 is fixed. The loops 300 may then be moved toward an axis line S to enter a space between the object and the ground or under a lateral protrusion of the object. The loops 300 may then be twisted together, thus gripping the object as a gap between the loops 300 becomes narrow.

In more detail, in the gripper according to the present disclosure, an angle θ between both ends of the loops 300 and a rotation shaft 400 may be increased or decreased as the first fixture 100 and the second fixture 200 are rotated relative to each other. Accordingly, the longitudinal center of the loop 300 may become closer to or farther away from the axis line S. A process of gripping the object by using the gripper configured in this way may be performed as follows: The loops 300 may grip the object 5 as the loops 300 gather together toward the axis line S and enter the space between the object 5 and the ground or under the protrusion of the object 5. On the other hand, the object may be released from the grip as the loops 300 spread out by being moved outward under the object 5 while being farther away from the axis line S.

FIG. 6 is a photograph showing a state where the gripper grips the object according to an embodiment of the present disclosure. It may be seen that transparent portions in the photograph are the loops 300 of the present disclosure, and the plurality of loops 300 may stably grip the object while being twisted together.

The process of gripping the object 5 by the relative rotation of the first fixture 100 and the second fixture 200 may be described in more detail as follows: The loops may stably grip the object 5 as a strap 330 is moved toward the axis line S to enter the space between the object 5 and the ground or under the lateral protrusion of the object 5, and then twisted and tightened. In particular, the gripper according to the present disclosure may easily and stably grip even an atypical object whose shape is not specified as the thin strap 330 enters the space between the object 5 and the ground or under the lateral protrusion of the object to grip the object.

The photograph of FIG. 6 shows the loop 300 made of a transparent material to effectively show the gripped object. However, the loop 300 may be made of various materials and shapes such as metal, synthetic resin, fiber, rubber, and paper, each of which is flexible and has a predetermined elasticity. A structure of the loop 300 is described in more detail below.

According to a gripping method for gripping an object by using a loop-type gripper 1000 of the present disclosure, the plurality of loops 300 may gather together to grip the object when the first fixture 100 and the second fixture 200 are rotated relative to each other in one direction as described above, and the plurality of loops 300 may each spread out to release the object when the first fixture 100 and the second fixture 200 are rotated relative to each other in the other direction.

Here, the relative rotation may be performed to control a spread degree of the plurality of loops 300 based on a size of the object to be gripped, and the relative rotation is performed to control a gathering degree of the plurality of loops 300 based on a grip force for gripping the object.

FIG. 7 is a perspective view showing an example of shapes of the loop 300 and the fixture in the present disclosure. In an example of FIG. 7, the first fixture 100 may be a plate-shaped first plate 110, the second fixture 200 may be a plate-shaped second plate 210, and one end 310 of each of the plurality of loops may be coupled to the first plate 110 or extended from the first plate 110, and the other end 320 of each of the plurality of loops may be coupled to the second plate 210 or extended from the second plate 210. That is, the gripper may include the first plate 110 and the second plate 210 rotated relative to each other, and the plurality of loops whose both ends are respectively extended or connected to the first plate 110 and the second plate 210, and the rotation shaft 400 rotating the first plate 110 or the second plate 210.

Here, the first plate 110 or the second plate 210 may be formed by stacking one end 310 or other end 320 of each of the plurality of loops on top of each other. In this case, one end 310 or the other end 320 of the stacked loops without a separate plate may serve as a plate. In more detail, the loop 300 may have the belt-shaped strap 330, one end 310 of the loop that is formed at one end of the strap 330, and the other end 320 of the loop that is formed at the other end of the strap 330, which are integrally formed with one another. Here, one end 310 of each of the plurality of loops 300 may be stacked on top of each other or the other end 320 of each of the loops may be stacked on top of each other in a regular pattern, and the first plate 110 may then be formed by fixing the stacked one end 310 of each of the loops on top of each other, and the second plate 210 may be formed by fixing the stacked other end 320 of each of the loops on top of each other.

Alternatively, the first plate 110, the second plate 210, and the loop part 300 may be separately configured from one another, and then also configured in such a way that one end of the loop 300 is fixedly connected to the first plate 110 and the other end of the loop 300 is fixedly connected to the second plate 210.

In addition, in configuring the first plate 110 and the second plate 210 to be rotated relative to each other, a shaft hole may be formed in the center of the first plate 110, and the rotation shaft 400 fixed to the center of the second plate 210 may pass through the shaft hole.

Hereinafter, the description describes a method of stacking the loops 300. Referring to FIGS. 3 and 4, the gripper in an embodiment may include six loops 300, and in stacking the six loops 300, the loop stacked on the lowest layer may be referred to as a first loop, and the loops stacked thereon may be sequentially referred to as second to the sixth loops. In this case, the straps may be arranged for each of two ends of each strap to have an equal angle (e.g., 60 degrees), and for each plane of one end of each of the stacked loops to face upward while one end of each of the loops of the first to sixth loops are stacked and fixed by locating one end of loop of the second loop on top of one end of the loop of the first loop.

The other end of each of the loops from the first to sixth loops may then also be sequentially stacked, and the assembled second plate 210 may be located on the first plate 110. As the second plate 210 is located on the first plate 110 in this way, the strap 330 may have a curvature, and the angle between each of the two ends of each strap 330 and the axis line S (e.g., 60 degrees) may be the same for all the six loops 300.

Meanwhile, one ends 310 and the other end 320 of each of the stacked loops may be disposed to face the same direction. However, when the stacked one ends 310 and the other end 320 of each of the loops are disposed to face opposite directions, the strap 330 may have a 180-degree twisted structure, through which a grip angle of the object, the grip force, or the like may also be adjusted.

FIGS. 8A to 8D are conceptual diagrams of various modifications in which the number of loops 300 is modified. The description describes the gripper above includes six loops 300 assembled to each other. However, more or fewer loops 300 of the gripper may be configured based on the size and weight of the object 5, and the angle θ may be changed based on the number of loops 300. The minimum number of loops 300 may be two. However, as shown in FIGS. 8A to 8D, various types of grippers may be configured by changing the number of spiral loops 300 or the width of the strap 330. FIG. 8A shows the gripper with six loops 300, FIG. 8B shows the gripper with eight loops 300, FIG. 8C shows the gripper with ten loops 300, and FIG. 8D shows the gripper with twelve loops 300.

FIG. 9 is a conceptual diagram of a modification including the plurality of grippers having different sizes. Referring to FIG. 9, the grippers of different sizes may be simultaneously mounted by installing a small gripper 1000S inside a large gripper 1000L. In this case, the small gripper 1000S having a shorter strap 330S may be disposed inside the large gripper 1000L having a longer strap 330L.

The lower drawing in FIG. 9 may be provided to schematically explain a disposition relationship between the large gripper 1000L and the small gripper 1000S along B-B'. An intermediate plate 120 may be disposed between the first plate 110 and the second plate 210.

In this case, one end 310 of the loop of the large gripper 1000L having the long strap 330L may be coupled to the first plate 110, and the other end 320 of the loop of the large gripper 1000L may be coupled to the intermediate plate 120. Meanwhile, one end 310 of the loop of the small gripper 1000S having the short strap 330S may be coupled to the first plate 110, and the other end 320 of the loop of the small gripper 1000S may be coupled to the second plate 210.

That is, grip conditions of the large gripper 1000L and small gripper 1000S may be controlled based on the relative rotation of the first plate 110, the intermediate plate 120, and the second plate while one end of the large gripper 1000L and one end of the small gripper 1000S are coupled together to the first plate 110.

FIG. 10 is a perspective view showing another example of shapes of the loop 300 and the fixture 100 or 200 in the present disclosure. Referring to FIG. 10, the first fixture 100 may be a plate-shaped first plate 110, and the second fixture 200 may be a cylindrical cylinder 220. That is, the other end 320 of the loop may be coupled to the inner or outer circumference of the cylindrical cylinder 220 or extended from one end of the cylindrical cylinder 220.

Here, the relative rotation may be performed at both the ends of the loop 300 when the rotation shaft 400 is coupled to the first plate 110 to rotate the first plate 110, through which the object may be gripped or released from the grip. Although not shown in the drawings, the object may be gripped or released from the grip by performing the relative rotation at both the ends of the loop 300 even when the first plate 110 is fixed and the cylindrical cylinder 220 is rotated.

FIG. 11 is a plan view showing another example of the loop 300 in the present disclosure. As described above, the loop 300 of the present disclosure may include the belt-shaped strap 330, one end 310 of the loop that is formed at one end of the strap 330, and the other end 320 of the loop that is formed at the other end of the strap 330. One end 310 of the loop and the other end 320 of the loop may each be a portion for fixing the strap 330 to the first fixture 100 or the second fixture 200, and have a polygonal or circular shape, and one end 310 of the loop and the other end 320 of the loop may each also have an area configured in various ways.

In addition, the strap 330 may be made of a material having a predetermined elasticity, and required to be able to change its curvature or twist degree based on the relative rotation of the first fixture 100 and the second fixture 200. The overall length of the strap 330 may be a predetermined width W, or the width and shape of the strap 330 may be variously modified as shown in FIG. 12.

Shaft holes 311 and 321 may respectively be formed in the center of one end 310 of the loop and that of the other end 320 of the loop, and bolt holes BH may be formed along the circumference of each shaft hole. The bolt holes BH in one end 310 of each of the stacked loops may communicate with each other, and the first plate 110 may be formed by fastening nuts to bolts passing through the bolt holes BH. In the case of the other end 320 of each of the loops, the second plate 210 may also be formed by fastening nuts to bolts passing through the bolt holes BH of the other end of each of the stacked loops 320. Alternatively, one end 310 of each of the stacked loops and the other end 320 of each of the loops may be attached and fixed to each other through adhesive and heat fusion.

FIGS. 12A to 13 are views each showing another example of the loop 300 in the present disclosure. Referring to FIG. 12A to 12D, the strap 330 may have a width changed from one end 310 of the loop to the other end 320 of the loop. That is, the strap 330 may have a width gradually decreased from one end to the other end (W1→W2) as shown in FIG. 12A, a middle portion of the strap 330 may have a width greater than that of one end 310 or the other end of the loop as shown in FIG. 12B, or the middle portion of the strap 330 may have a width smaller than that of one end 310 or the other end of the loop as shown in FIG. 12C. Alternatively, the strap 330 may be bent with the predetermined curvature as shown in FIG. 12D.

FIG. 13 is a view showing another modification of the loop 300. Referring to FIG. 13, the loop 300 may include a reinforcing member 340 formed therein and having greater rigidity than that of the strap 330. That is, as shown in a cross-sectional view of A-A' in FIG. 13, the strap 330 may have a thin thickness by making the reinforcing member 340 located in the center of the strap 330 have the greater rigidity than that of the surrounding strap 330. In this way, it is possible to improve grip ability of the gripper by maintaining the overall rigidity of the strap 330 while making it easier for the gripper to be closer to the object for the grip.

FIG. 14 is a conceptual diagram showing an example in which the gripper is mounted on a robot arm according to the present disclosure, and FIG. 15 is a conceptual diagram showing another example in which the gripper is mounted on the robot arm according to the present disclosure.

As shown in FIG. 14, in the gripper, the rotation shaft 400 may pass through the first plate 110 while the rotation shaft 400 is fixed to the center of the second plate 210. In this case, the second plate 210 may be rotated and the first plate 110 may be fixed to a distal end of a robot arm 1, the rotation shaft 400 may be rotated by a motor 500 mounted on the robot arm 1, and the gripper may grip or release the object 5 as the second plate 210 is rotated by the rotation of the rotation shaft 400.

Therefore, the robot arm 1, which is an apparatus for conveyance, may operate and lift the object 5 while the loops 300 of the gripper enter under the object 5 to grip the object 5. Here, the object 5 may be lifted by a vertical drag force while spanning the loops 300. In this state, the object may be conveyed to a destination by the robot arm 1. The loops 300 may then spread out under the object 5 toward the outside of the object 5 when the first plate 110 and the second plate 210 are rotated relative to each other in the opposite directions, thereby releasing the object 5 from the grip.

On the other hand, in the gripper shown in FIG. 15, the rotation shaft 400 fixed to the second plate 210 may pass through the first plate 110 to be fixed to the distal end of the robot arm 1, and a pinion 420 mounted on the robot arm 1 may be coupled to a rack 410 fixed to the circumference of an upper surface of the first plate 110. In this state, the first plate 110 may be rotated while the rack 410 is moved as the pinion 420 is driven.

FIGS. 14 and 15 conceptually show examples in each of which the gripper is installed on the robot arm 1 to explain an operational relationship of the gripper based on the relative rotation of the first plate 110 and the second plate 210 of the gripper according to the present disclosure, and the apparatus for conveyance is not limited to the robot arm 1. In addition, it is apparent that a driving method to configure the relative rotation of the first plate 110 and the second plate 210 may be variously changed, and the driving method of the first plate 110 and the second plate 210 is not limited to the configurations shown in FIGS. 14 and 15.

As set forth above, in the gripper according to an embodiment of the present disclosure, the loop part may be moved toward the axis line and enter the space between the object and the ground or under the lateral protrusion of the object when the first fixture and the second fixture are rotated relative to each other to grip the object located inside the spreading-out loops. The loops may then be twisted together, thus stably gripping the object as the gap between the loops becomes narrow.

In particular, the gripper may easily and stably grip even the atypical object as the loop part enters the space between the object and the ground or under the lateral protrusion of the object to grip the object.

In addition, the gripper according to the present disclosure may require a smaller force to press the object compared to the conventional gripper, thus preventing the object from being damaged because the loop enters the space between the object and the ground or under the lateral protrusion of the object to lift and convey the object while gripping the object.

In addition, the gripper according to the present disclosure may have a simple structure and a small weight, thus reducing the payload.

What is claimed is:

1. A gripper for gripping an object, the gripper comprising:

a plate-shaped first plate;

a plate-shaped second plate; and a plurality of twisted loops each having a predetermined curvature, one end of each of the plurality of twisted loops being connected to the first plate, and another end of each of the plurality of twisted loops being connected to the second plate, wherein the first plate is formed by stacking the one end of each of the plurality of twisted loops on top of each other, and the second plate is formed by stacking the another end of each of the plurality of twisted loops on top of each other, and wherein middle portions of the plurality of twisted loops gather together or spread out to grip or release the object based on relative rotation of the first plate and the second plate.

2. The gripper of claim 1, wherein a rotation shaft rotating the first plate or the second plate is coupled to the first plate or the second plate.

3. The gripper of claim 1, wherein the plurality of twisted loops includes a large loop set having longer straps and a small loop set having shorter straps disposed inside the large loop set.

4. The gripper of claim 3, further comprising an intermediate plate disposed between the first plate and the second plate, one end of the longer straps of the large loop set is connected to the first plate, and the other end of the longer straps of the large loop set is connected to the intermediate plate, one end of the shorter straps of the small loop set is connected to the first plate, and the other end of the shorter straps of the small loop set is connected to the second plate, and the large loop set and the small loop set are controlled based on the relative rotation of the first plate, the intermediate plate, and the second plate.

5. The gripper of claim 1, wherein each of the plurality of twisted loops is a strap having a predetermined elasticity.

6. The gripper of claim 5, wherein each of the plurality of twisted loops has a predetermined width, a width gradually decreased or increased from the one end to the another end, or a middle portion having a width greater or smaller than that of the one end or the another end.

7. The gripper of claim 1, wherein each of the plurality of twisted loops is an arc-shaped strap bent with the predetermined curvature.

8. The gripper of claim 1, wherein each of the plurality of twisted loops includes a reinforcing member formed therein and having greater rigidity than that of the strap.

9. A gripping method for gripping an object by using a loop-type gripper, the method comprising:

providing the gripper, wherein the gripper comprises a plate-shaped first plate, a plate-shaped second plate, and a plurality of twisted loops each having a predetermined curvature, one end of each of the plurality of twisted loops being connected to the first plate and another end of each of the plurality of twisted loops being connected to the second plate, the first plate being formed by stacking the one end of each of the plurality of twisted loops on top of each other, and the second plate being formed by stacking the another end of each of the plurality of twisted loops on top of each other, rotating the first plate and the second plate relative to each other in one direction such that middle portions of the plurality of twisted loops gather together to grip the object; and rotating the first plate and the second plate relative to each other in another direction such that the middle portions of the plurality of twisted loops spread out to release the object.

10. The gripping method of claim 9, wherein the relative rotation controls a spread degree of the plurality of loops based on a size of the object to be gripped, or a gathering degree of the plurality of loops based on a grip force for gripping the object.

11. An apparatus for conveyance for conveying an object, the apparatus for conveyance comprising:

a gripper mounted on a distal end of the apparatus for conveyance, the gripper comprising a first fixture and a second fixture, and including a plurality of twisted loops each having a predetermined curvature, middle portions of the plurality of twisted loops being configured to grip or release the object as the middle portions gather together or spread out based on relative rotation of the first fixture and the second fixture; and a motor rotating the first fixture or the second fixture of the gripper.

12. The apparatus for conveyance of claim 11, wherein the first fixture is a plate-shaped first plate, the second fixture is a plate-shaped second plate, one end of each of the plurality of loops are coupled to the first plate or extended from the first plate, and another end of each of the plurality of loops are coupled to the second plate or extended from the second plate.

13. The apparatus for conveyance of claim 12, further comprising a rotation shaft connected to the motor and rotating the first plate or the second plate.

14. The apparatus for conveyance of claim 12, wherein the first plate is formed by stacking the one end of each of the plurality of loops on top of each other, and the second plate is formed by stacking the other end of each of the plurality of loops on top of each other.

15. The apparatus for conveyance of claim 11, wherein the first fixture is a plate-shaped first plate, and the second fixture is a cylindrical cylinder.

16. The apparatus for conveyance of claim 15, wherein a rotation shaft of the motor is connected to the first plate to rotate the first plate, or the motor is connected to the cylindrical cylinder to rotate the cylindrical cylinder.

* * * * *